(12) United States Patent
Ha

(10) Patent No.: US 8,559,515 B2
(45) Date of Patent: Oct. 15, 2013

(54) APPARATUS AND METHOD FOR ENCODING AND DECODING MULTI-VIEW VIDEO

(75) Inventor: Tae-hyeun Ha, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1643 days.

(21) Appl. No.: 11/524,305

(22) Filed: Sep. 21, 2006

(65) Prior Publication Data

US 2007/0064799 A1 Mar. 22, 2007

Related U.S. Application Data

(60) Provisional application No. 60/718,740, filed on Sep. 21, 2005.

(30) Foreign Application Priority Data

Apr. 3, 2006 (KR) .......................... 10-2006-0030147

(51) Int. Cl.
*H04N 7/12* (2006.01)
*H04N 11/02* (2006.01)
*H04N 11/04* (2006.01)

(52) U.S. Cl.
USPC ............. 375/240.16; 375/240.01; 375/240.12

(58) Field of Classification Search
USPC ........................ 375/240.16, 240.01, 240.12
See application file for complete search history.

(56) References Cited

U.S. PATENT DOCUMENTS

| | | | |
|---|---|---|---|
| 5,612,735 A * | 3/1997 | Haskell et al. ................. 348/43 |
| 5,619,256 A | 4/1997 | Haskell | |
| 6,724,821 B1 * | 4/2004 | Sawada ..................... 375/240.16 |
| 6,999,513 B2 * | 2/2006 | Sohn et al. ................ 375/240.16 |
| 2003/0202592 A1 | 10/2003 | Sohn et al. | |
| 2004/0165765 A1 | 8/2004 | Sung et al. | |

FOREIGN PATENT DOCUMENTS

| | | |
|---|---|---|
| EP | 1 389 017 A2 | 2/2004 |
| JP | 07-222167 A | 8/1995 |
| JP | 10-191394 A | 7/1998 |
| KR | 1999-025488 A | 4/1999 |
| KR | 19990050410 A | 7/1999 |
| KR | 20030076906 A | 9/2003 |
| KR | 20030083285 A | 10/2003 |
| WO | 2004021711 A1 | 3/2004 |

OTHER PUBLICATIONS

Communication from the Japanese Patent Office issued Aug. 17, 2010, in counterpart Japanese Application No. 2008-529927.

(Continued)

*Primary Examiner* — Chikaodili E Anyikire
(74) *Attorney, Agent, or Firm* — Sughrue Mion, PLLC

(57) ABSTRACT

A method and apparatus are provided for encoding and decoding a multi-view video. The multi-view video encoding apparatus includes a disparity estimator receiving a current frame and a reference frame and estimating disparity vectors between the current frame and the reference frame by the block; a disparity deviation calculator calculating deviations between the estimated disparity vectors and calculating deviations of the deviations between the estimated disparity vectors; and an encoder encoding the multi-view video using the calculated deviations of the disparity vectors or the calculated deviations of the deviations of the disparity vectors. Therefore, it is possible to enhance compressibility of a multi-view video.

16 Claims, 6 Drawing Sheets

(56) References Cited

OTHER PUBLICATIONS

Communication dated Aug. 10, 2012 issued by the Korean Intellectual Property Office in counterpart Korean Patent Application No. 10-2006-0030147.

Communication dated Feb. 14, 2013 issued by the Korean Intellectual Property Office in counterpart Korean Application No. 10-2006-0030147.

* cited by examiner

APPARATUS AND METHOD FOR ENCODING AND DECODING MULTI-VIEW VIDEO

CROSS-REFERENCE TO RELATED PATENT APPLICATION

This application claims priority from Korean Patent Application No. 10-2006-0030147, filed on Apr. 3, 2006, in the Korean Intellectual Property Office, and U.S. Provisional Patent Application No. 60/718,740, filed on Sep. 21, 2005, in the U.S. Patent and Trademark Office, the disclosures of which are incorporated herein in their entirety by reference.

BACKGROUND OF THE INVENTION

1. Field of the Invention

Apparatuses and methods consistent with the present invention relate to encoding and decoding a multi-view video, and more particularly, to encoding and decoding the multi-view video, in order to improve compressibility of the multi-view video.

2. Description of the Related Art

The new H.264 video coding standard is noted for high encoding efficiency compared to conventional standards. The new H.264 video coding standard depends on various new characteristics, such as considering a variable block size between 16×16 and 4×4, a quadtree structure for motion compensation in a loop deblocking filter, a multi-reference frame, intra prediction, and context adaptability entropy coding, as well as considering general bi-directional (B) estimation slices. Unlike the MPEG-2 standard, the MPEG-4 Part 2 standard, etc., the B slices can refer to different slices while using multi-prediction obtained from the same direction (forward or backward). However, the above-described characteristics require a large amount of data for motion information including a motion vector and/or reference picture in an estimation mode for the H.264 video coding standard.

In order to relieve this problem, a skip mode and a direct mode are respectively introduced into predicted (P) slices and B slices. The skip and direct modes allow motion estimation of an arbitrary block of a picture to be currently encoded, using motion vector information previously encoded. Accordingly, additional motion data for macroblocks (MBs) or blocks is not encoded. Motions for these modes are obtained using spatial (skip) or temporal (direct) correlation of motions of adjacent MBs or pictures.

FIG. 1 is a view for explaining a direct mode of a B picture.

The direct mode is to obtain a forward motion vector and a backward motion vector using a motion vector of a co-located block of a temporally following P picture, when estimating a motion of an arbitrary block of a B picture to be currently encoded.

In order to calculate a forward motion vector $MV_{L0}$ and a backward motion vector $MV_{L1}$ of a direct mode block 102 whose motion will be estimated in a B picture 110, a motion vector MV for a reference list 0 image 130, which a co-located block 104 which is at the same position as the direct mode block 102 in a reference list 1 picture 120 as a temporally following picture refers by a motion vector, is detected. Thus, the forward motion vector $MV_{L0}$ and the backward motion vector $MV_{L1}$ of the direct mode block 102 of the B picture 110 are calculated using the following Equations 1 and 2.

$$\vec{MV}_{L0} = \frac{TR_B}{TR_D} \times \vec{MV} \quad (1)$$

$$\vec{MV}_{L1} = \frac{(TR_B - TR_D)}{TR_D} \times \vec{MV} \quad (2)$$

where MV represents the motion vector of the co-located block 104 of the reference list 1 picture 120, $TR_D$ represents a distance between the reference list 0 picture 130 and the reference list 1 picture 120, and $TR_B$ represents a distance between the B picture 110 and the reference list 0 picture 130.

FIG. 2 is a view for explaining a method of estimating a motion vector in a spatial area.

According to the H.264 standard used for encoding video data, a frame is divided into blocks, each having a predetermined size, and a most similar block is searched with reference to an adjacent frame(s) subjected to encoding. That is, an intermediate value of motion vectors of a left lower macroblock 4, an upper middle macroblock 2, and an upper right macroblock 3 of a current macroblock c is determined as an estimation value of the corresponding motion vector. The motion vector estimation can be expressed by Equation 3.

$$\begin{cases} pmvx = \text{MEDIAN}(mvx2, mvx3, mvx4) \\ pmvy = \text{MEDIAN}(mvy2, mvy3, mvy4) \end{cases} \quad (3)$$

As such, a method of encoding a video using spatial correlation as well as temporal correlation has been proposed. However, a method of enhancing the compressibility and processing speed of a multi-view video having a significantly greater amount of information than a general video, is still required.

SUMMARY OF THE INVENTION

The present invention provides a method and apparatus for encoding a multi-view video, in order to improve compressibility of the multi-view video, using correlation between disparity vectors for multi-view videos photographed by multi-view cameras.

The present invention also provides a method and apparatus for decoding an encoded multi-view video, using correlation between disparity vectors for the multi-view video.

According to an aspect of the present invention, there is provided an apparatus for encoding a multi-view video, including: a disparity estimator which receives a current frame and a reference frame and which estimates disparity vectors between the current frame and the reference frame by the block; a disparity deviation calculator which calculates deviations between the estimated disparity vectors and calculates deviations of the deviations between the estimated disparity vectors; and an encoder which encodes the multi-view video using the calculated deviations of the disparity vectors or the calculated deviations of the deviations of the disparity vectors.

The deviations between the estimated disparity vectors are constant.

The multi-view video encoding apparatus further includes: an encoding mode selector which selects whether to encode the multi-view video using the deviations of the disparity vectors or whether to encode the multi-view video using the deviations of the deviations of the disparity vectors, according to predetermined criteria, and sets mode information accordingly, wherein the encoder encodes the multi-view video with the set mode information based on the set mode information.

The disparity deviation calculator includes: a first buffer which stores the estimated disparity vectors; a primary calculation performing unit which calculates deviations between the disparity vectors stored in the first buffer; a second buffer which stores the deviations between the disparity vectors; and a secondary calculation performing unit which calculates deviations of the deviations between the disparity vectors.

According to another aspect of the present invention, there is provided a method of encoding a multi-view video, including: receiving a current frame and a reference frame and estimating disparity vectors between the current frame and the reference frame by the block; calculating deviations between the estimated disparity vectors and deviations of the deviations between the estimated disparity vectors; and encoding the multi-view video, using the deviations between the disparity vectors or the deviations of the deviations between the disparity vectors.

According to another aspect of the present invention, there is provided an apparatus for decoding a multi-view video, including: an encoding mode checking unit which checks a mode information indicating a multi-view video encoding mode included in an encoded multi-view video; a disparity vector determining unit which determines disparity vectors for the multi-view video according to the checked mode information; and a decoder which decodes the multi-view video using the determined disparity vectors, wherein the mode information indicating the multi-view video encoding mode indicates that the multi-view video is encoded using deviations of disparity vectors or that the multi-view video is encoded using deviations of the deviations of the disparity vectors.

When the mode information indicates that the multi-view video is encoded using the deviations of the disparity vectors, if a deviation of a disparity vector $DV_i$ of a block positioned at a current location i is $dDV_i$, the disparity vector determining unit sums a disparity vector $DV_{i-1}$ of the previous block and the deviation $dDV_i$ of the disparity vector $DV_i$, thereby determining the disparity vector $DV_i$ of the block positioned at the current i location.

According to another aspect of the present invention, there is provided a method of decoding a multi-view video, including: checking a mode information indicating a multi-view video encoding mode included in an encoded multi-view video; determining disparity vectors for the multi-view video according to the checked mode information; and decoding the multi-view video using the determined disparity vectors, wherein the mode information indicating the multi-view video encoding mode indicates whether the multi-view video is encoded using deviations of the disparity vectors or whether the multi-view video is encoded using deviations of the deviations of the disparity vectors.

BRIEF DESCRIPTION OF EXEMPLARY EMBODIMENTS OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described in detail with reference to the appended drawings.

Figures 1, 2:
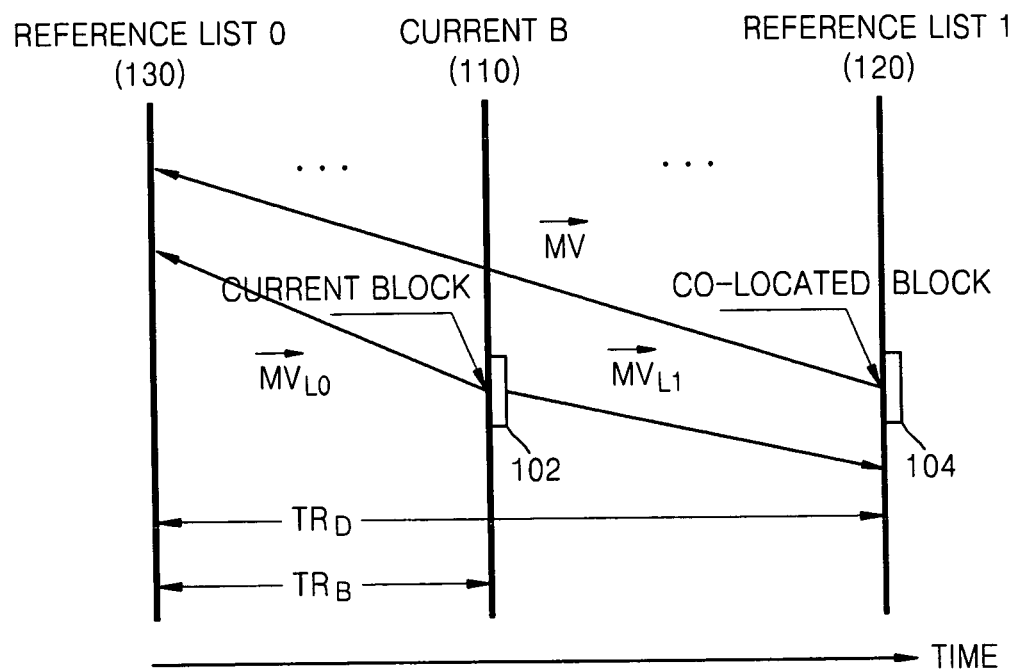
FIG. 1 is a view for explaining a direct mode of a B picture.
FIG. 2 is a view for explaining a method of estimating a motion vector in a spatial area.
Figure 3:
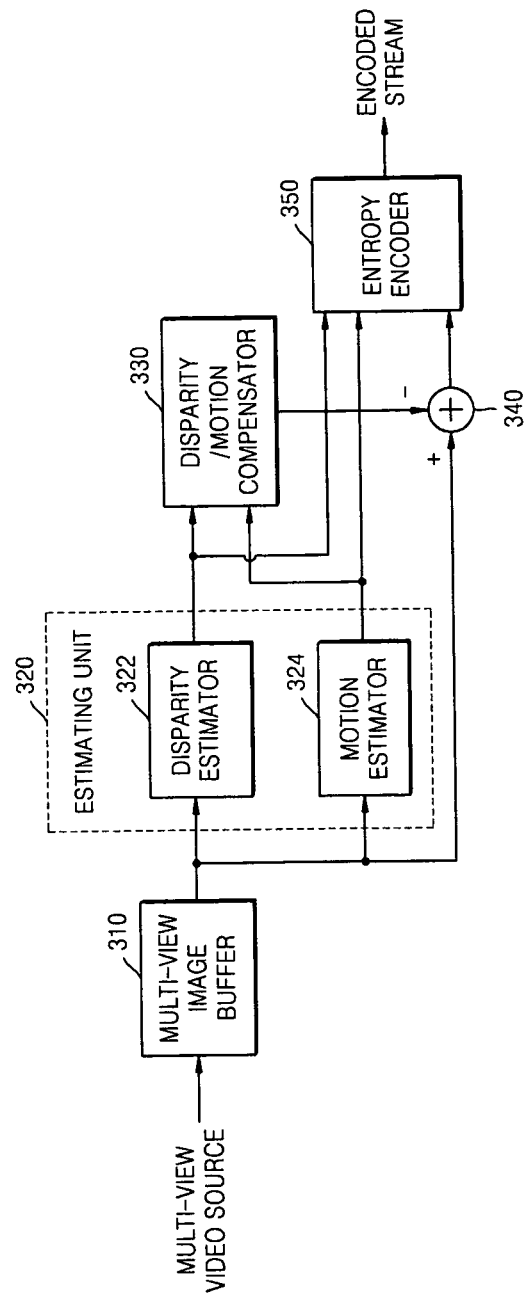
FIG. 3 is a block diagram of a multi-view video encoding apparatus according to an exemplary embodiment of the present invention.

FIG. 3 is a block diagram of a multi-view video encoding apparatus according to an exemplary embodiment of the present invention.

Referring to FIG. 3, the multi-view video encoding apparatus includes a multi-view image buffer 310, an estimating unit 320, a disparity/motion compensator 330, a residual image encoder 340, and an entropy encoder 350.

In FIG. 3, the multi-view video encoding apparatus receives multi-view video source data obtained from a plurality of camera systems or using different methods. The received multi-view video source data are stored in the multi-view image buffer 310. The multi-view image buffer 310 provides the stored multi-view video source data to the estimating unit 320 and the residual image encoder 340.

The estimating unit 320 includes a disparity estimator 322 and a motion estimator 324, and performs motion estimation and disparity estimation on the stored multi-view video.

The disparity/motion compensator 330 performs disparity and motion compensation using motion vectors and disparity vectors estimated by the disparity estimator 322 and the motion estimator 324. The disparity/motion compensator 330 reconstructs an image using the motion vector and disparity vector and provides the reconstructed image to the residual image encoder 340.

The residual image encoder 340 encodes a residual image obtained by subtracting the image compensated and reconstructed by the disparity/motion compensator 330 from the original image provided by the multi-view image buffer 310 and provides the encoded residual image to the entropy encoder 350, in order to provide a better visual quality and three-dimensional effect.

The entropy encoder 350 receives information regarding the disparity vectors and the motion vectors generated by the estimating unit 320 and a residual picture from the residual image encoder 340, and generates a bitstream for the multi-view video source data.

Like motion information for motion estimation and motion compensation used in conventional codecs such as the H.264 and MPEG 2/4 standards, the disparity information estimated by the disparity estimator 322 illustrated in FIG. 3 is used for disparity compensation. As in a trial for reducing motion information and increasing encoding efficiency in the H.264 standard, a trial for reducing disparity information and increasing encoding efficiency in Multi-view Video Coding (MVC) should be performed.

According to an exemplary embodiment of the present invention, the disparity estimator 322 estimates disparity vectors in units of a predetermined number of blocks, and calculates deviations between the estimated disparity vectors or calculates deviations of the deviations, in order to improve encoding efficiency.

The multi-view video encoding according to an exemplary embodiment of the present invention is performed using the calculated deviations and the calculated deviations of the deviations.

Figure 4:
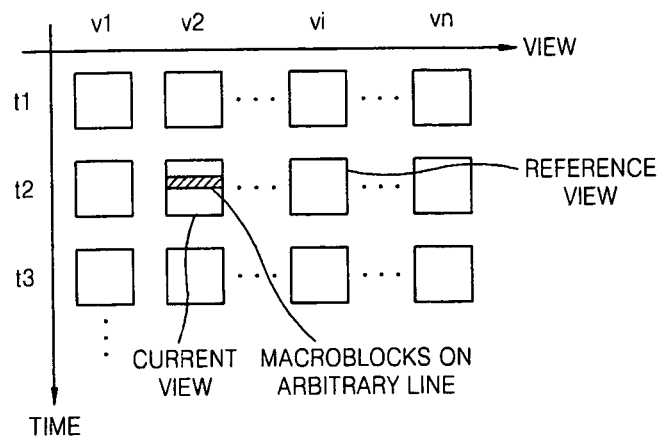
FIG. 4 is a view for explaining frame sequences photographed by multi-view cameras, according to an exemplary embodiment of the present invention.

FIG. 4 is a view for explaining frame sequences photographed by multi-view cameras, according to an exemplary embodiment of the present invention.

In FIG. 4, the horizontal axis is a view axis and represents the number of multi-view cameras for photographing multi-view pictures, and the vertical axis is a time axis and represents the number of time sequences. If the multi-view cameras are arranged in parallel, high correlation will exist between multi-view frames disposed on the same time sequence. Although the multi-view cameras are not arranged in parallel, since frames photographed by the multi-view cameras can be rectified to the state photographed by multi-view cameras arranged in parallel, correlation between the photographed frames will exist. Accordingly, it is possible to encode multi-view video using the correlation between the multi-view frames.

Figure 5:
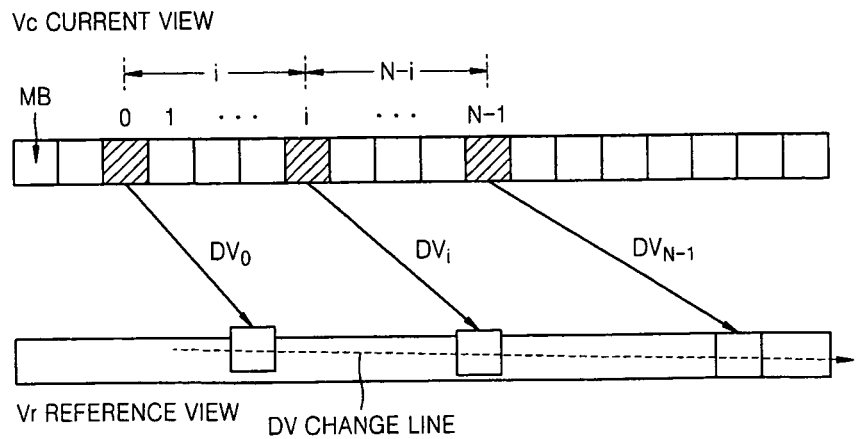
FIG. 5 is a view for explaining the case when deviations of disparity vectors are constant, according to an exemplary embodiment of the present invention.
Figure 6:
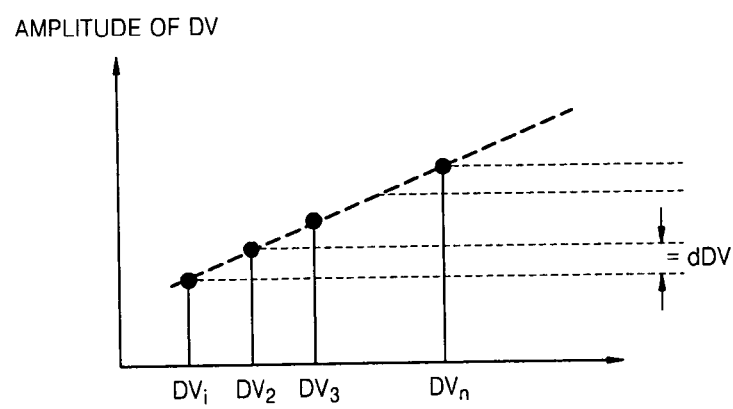
FIG. 6 is a graph plotting correlation between the disparity vectors when deviations of disparity vectors are constant, as illustrated in FIG. 5.

FIG. 5 is a view for explaining the case when deviations of disparity vectors are constant, according to an exemplary embodiment of the present invention, and FIG. 6 is a graph plotting correlation between the disparity vectors when deviations of disparity vectors are constant, as illustrated in FIG. 5.

In FIG. 5, Vc and Vr respectively represent lines of macroblocks (MBs) in arbitrary frames disposed on the same time sequence, wherein Vr represents an encoded reference view frame and Vc represents a frame estimated using the encoded reference view frame Vr to be currently encoded. FIG. 6 shows changes in the absolute values of the disparity vectors DV of the respective MBs.

Referring to FIG. 5, when a current MB is positioned at a location i, the previous MB is positioned at a location i−1 to the left of the current MB.

As illustrated in FIGS. 5 and 6, if it is assumed that the disparity vectors DV of successive MBs in a MB line linearly change, a deviation (difference) $dDV_i$ between a disparity vector $DV_i$ of the MB at the predetermined location i and a disparity vector $DV_{i-1}$ of the previous MB is constant. For example, in FIG. 6, $dDV_2'=DV_2-DV_1$, $dDV_3=DV_3-DV_2$, $dDV_4=DV_4-DV_3$, and $dDV_n=DV_n-DV_{n-1}$. That is, all calculated dDV values are constant. Accordingly, if a disparity vector is encoded using an initial DV value and an initial dDV value, a decoding apparatus can estimate disparity vectors DV of respective MBs using the DV value and the dDV value.

A relationship between deviations dDV of disparity vectors DV of adjacent MBs of the predetermined MB can be expressed as ddDV which is a deviation of the deviations dDV of the disparity vectors DV. If a deviation of a deviation of a disparity vector of a MB positioned at a current location i is $ddDV_i$, since $ddDV_i=dDV_i-dDV_{i-1}$, deviations ddDV of deviations dDV of all disparity vectors DV become zero in case of FIGS. 5 and 6. Accordingly, when a multi-view video is encoded using $ddDV_i$, the decoding apparatus can calculate a deviation $dDV_i$ of a disparity vector $DV_i$ of the current MB, using $ddDV_i$ and $dDV_{i-1}$ which is a deviation of a disparity vector $DV_{i-1}$ of the previous MB and of the current MB. That is, a deviation $dDV_i$ of a disparity vector $DV_i$ of the current MB positioned at the current location i can be calculated using the following Equation 4.

$$dDV_i=dDV_{i-1}+ddDV_i \tag{4}$$

if the deviation $dDV_i$ is calculated, a disparity vector $DV_i$ of the current MB positioned at the current location i can be also calculated using Equation 5.

$$DV_i=DV_{i-1}+dDV_i \tag{5}$$

As described above, by encoding a multi-view video using a deviation dDV of a disparity vector DV or a deviation ddDV of the deviation dDV of the disparity vector DV, encoding efficiency of the multi-view video can be enhanced. Also, encoding ddDV can have higher compression efficiency compared to encoding dDV. A disparity vector DV required for decoding a multi-view video encoded using dDV or ddDV can be determined using Equations 4 and 5.

Figure 7:
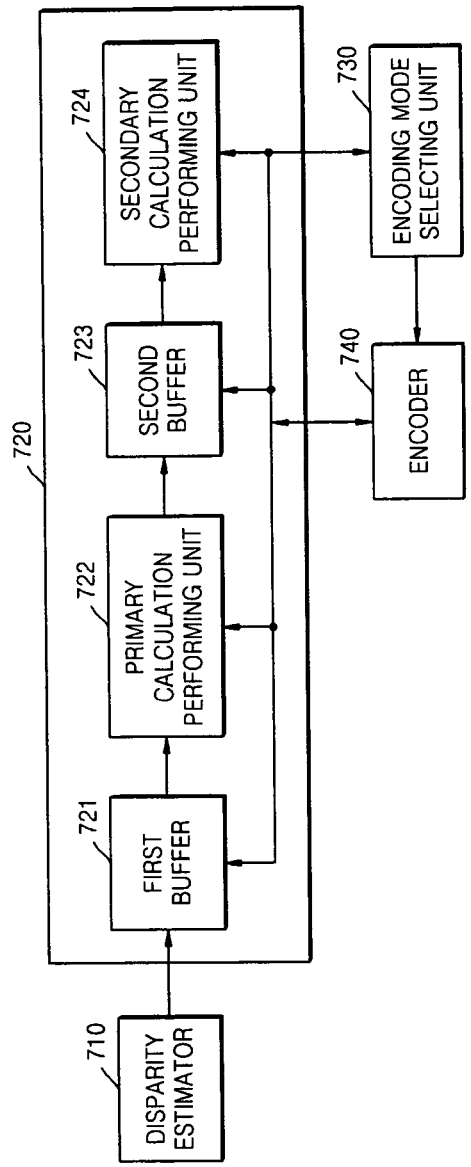
FIG. 7 is a block diagram of a multi-view video encoding apparatus according to another exemplary embodiment of the present invention.

FIG. 7 is a block diagram of a multi-view video encoding apparatus according to another exemplary embodiment of the present invention.

Referring to FIG. 7, the multi-view video encoding apparatus includes a disparity estimator 710, a disparity deviation calculator 720, an encoding mode selecting unit 730, and an encoder 740. The disparity deviation calculator 720 includes a first buffer 721 which temporarily stores disparity vectors, a primary calculation performing unit 722 which calculates deviations of the disparity vectors, a second buffer 723 which temporarily stores the deviations of the disparity vectors, and a secondary calculation performing unit 724 which calculates deviations of the deviations.

First, a current frame and a reference frame, which are successive frames, are input to the disparity estimator 710. The disparity estimator 710 estimates disparity vectors DV by the predetermined block between two frames, for example, by the macroblock (MB) between two frames. Here, deviations between disparity vectors by the predetermined block can be constant.

The disparity deviation calculator 720 calculates deviations between estimated disparity vectors or calculates deviations of the deviations between the estimated disparity vectors. First, estimated disparity vectors by the block are input to the first buffer 721 of the disparity deviation calculator 720 and temporarily stored in the first buffer 721. Then, the estimated disparity vectors by the block are transferred to the primary calculation performing unit 722. When a disparity vector of a block positioned at a current location i is $DV_i$, the primary calculation performing unit 722 calculates a deviation $dDV_i$ of the disparity vector $DV_i$, which is a difference between the disparity vector $DV_i$ and the previous disparity vector $DV_{i-1}$.

The calculated deviation $dDV_i$ of the disparity vector $DV_i$ is transferred to the second buffer 723 and temporarily stored therein. The deviation $dDV_i$ of the disparity vector $DV_i$ temporarily stored in the second buffer 723 is transferred to the secondary calculation performing unit 724. The secondary calculation performing unit 724 calculates a deviation $ddDV_i$ of the deviation $dDV_i$ of the disparity vector $DV_i$, which is a difference between the deviation $dDV_i$ and a deviation $dDV_{i-1}$ of the previous disparity vector $DV_{i-1}$.

The encoder 740 encodes a multi-view video, using the deviations of disparity vectors or the deviations of the deviations of disparity vectors, calculated by the disparity deviation calculator 720.

The encoding mode selecting unit 730 selects whether to encode the multi-view video using the deviation $dDV_i$ of the disparity vector $DV_i$, or whether to encode the multi-view video using the deviation $ddDV_i$ of the deviation $dDV_i$ of the disparity vector $DV_i$, according to predetermined criteria. The encoding mode selecting unit 730 sets a mode information, for example, flag Flag_ddDV and transfers it to the encoder 740, in order to distinguish when the multi-view video is encoded using the deviation $dDV_i$ of the disparity vector $DV_i$ from when the multi-view video is encoded using the deviation $ddDV_i$ of the deviation $dDV_i$ of the disparity vector $DV_i$. The mode information includes information about encoding mode and is not limited to type of information. It is possible that alternative method can be used, in order to distinguish when the multi-view video is encoded using the deviation $dDV_i$ of the disparity vector $DV_i$ from when the multi-view video is encoded using the deviation $ddDV_i$ of the deviation $dDV_i$ of the disparity vector $DV_i$.

If the encoding mode selecting unit 730 selects an encoding mode of encoding the multi-view video using the deviation $dDV_i$, the encoding mode selecting unit 730 can set the flag Flag_ddDV to 0 and transfer it to the encoder 740. If the encoding mode selecting unit 730 selects an encoding mode of encoding the multi-view video using the deviation $ddDV_i$ of the deviation $dDV_i$, the encoding mode selecting unit 730 can set the flag Flag_ddDV to 1 and transfer it to the encoder 740.

The encoder 740 can encode the multi-view video from the flag value transferred from the encoding mode selecting unit 730. If the flag Flag_ddDV is set to 0, the encoder 740 encodes the multi-view video using the deviation $dDV_i$ with the flag information. If the flag Flag_ddDV is set to 1, the encoder 740 encodes the multi-view video using the deviation $ddDV_i$ of the deviation $dDV_i$ with the flag information.

Figure 8:
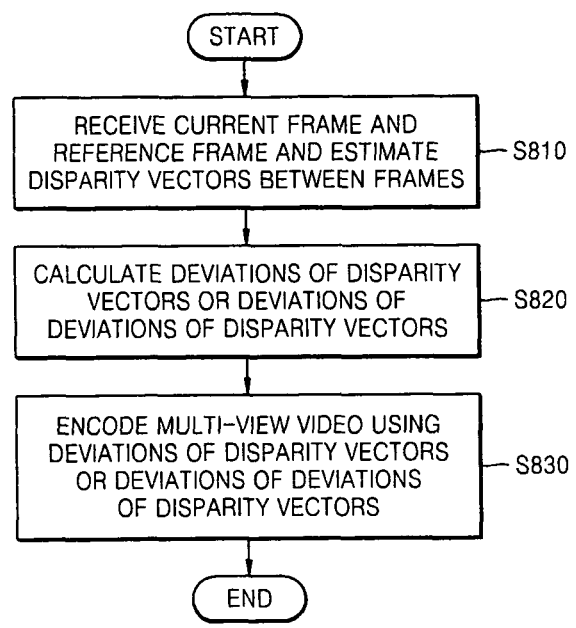
FIG. 8 is a flowchart illustrating a multi-view video encoding method according to an exemplary embodiment of the present invention.

FIG. 8 is a flowchart illustrating a multi-view video encoding method according to an exemplary embodiment of the present invention.

Referring to FIG. 8, first, a current frame and a reference frame are received, and disparity vectors between frames are estimated by the predetermined block (operation S810). Then, deviations between the estimated disparity vectors or deviations of the deviations between the estimated disparity vectors are calculated (operation S820). A multi-view video is encoded using the deviations of the disparity vectors or the deviations of the deviations of the disparity vectors (operation S830). Between operation S820 and operation S830, there can be further included an operation of selecting whether to encode the multi-view video using the deviations between the disparity vectors or whether to encode the multi-view video using the deviations of the deviations of the disparity vectors, according to predetermined criteria. When operation S830 is performed, the multi-view video can be encoded according to a selected encoding mode.

Figure 9:
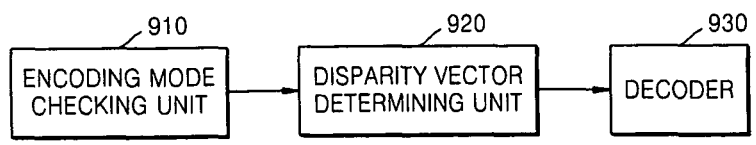
FIG. 9 is a block diagram of a multi-view video decoding apparatus according to an exemplary embodiment of the present invention.

FIG. 9 is a block diagram of a multi-view video decoding apparatus according to an exemplary embodiment of the present invention.

Referring to FIG. 9, the multi-view video decoding apparatus includes a decoding mode checking unit 910, a disparity vector determining unit 920, and a decoder 930.

The decoding mode checking unit 910 checks a mode information, for example, flags representing a multi-view video encoding mode included in a received encoded multi-view video.

The disparity vector determining unit 920 determines disparity vectors for the multi-view video according to the checked flags.

Hereinafter, a process of allowing the disparity vector determining unit 920 to determine disparity vectors will be described. It is assumed that a flag indicates that encoding is performed using deviations of disparity vectors and a deviation of a disparity vector $DV_i$ of a predetermined block (for example, a macroblock) positioned at a current location i is $dDV_i$. In this case, by summing a disparity vector $DV_{i-1}$ of the previous macroblock and the deviation $dDV_i$ of the disparity vector $DV_i$, the disparity vector $DV_i$ of the macroblock positioned at the current location i is determined.

When the flag indicates that encoding is performed using deviations of deviations of disparity vectors, the disparity vectors can be determined as follows. First, if a deviation of a deviation $dDV_i$ of a disparity vector $DV_i$ of a macroblock positioned at a current location i is $ddDV_i$, by summing a deviation $dDV_{i-1}$ of a disparity vector $DV_{i-1}$ of the previous macroblock and the deviation $ddDV_i$ of the deviation $dDV_i$ of the disparity vector $DV_i$, the deviation $dDV_i$ of the disparity vector $DV_i$ of the macroblock positioned at the current location i is determined. Then, by summing the disparity vector $DV_{i-1}$ of the previous macroblock and the determined deviation $dDV_i$ of the disparity vector $DV_i$, the disparity vector $DV_i$ of the macroblock positioned at the current location i is determined.

The decoder 930, as described above, decodes a multi-view video using a disparity vector determined according to the checked flag, that is, according to the checked decoding mode.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, according to the present invention, since deviations for disparity vectors for respective blocks or deviations of the deviations for the disparity vectors for the respective blocks are encoded using correlation between the disparity vectors, it is possible to improve compressibility of a multi-view video.

Also, according to the present invention, a method and apparatus for decoding a multi-view video encoded using correlation between disparity vectors for the multi-view video are provided.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. An apparatus for encoding a multi-view video, the apparatus comprising:
   a disparity estimator which receives a current frame and a reference frame, and estimates disparity vectors between the current frame and the reference frame;

a disparity deviation calculator which calculates deviations between the disparity vectors and calculates deviations of the deviations between the disparity vectors; and an encoder which encodes the disparity vectors video using the deviations between the disparity vectors or the deviations of the deviations between the disparity vectors, wherein the deviations between the disparity vectors are constant, and wherein the deviations of the deviations between the disparity vectors are zero.

2. The apparatus of claim 1, wherein the disparity estimator estimates the disparity vectors between the current frame and the reference frame in units of a predetermined number of blocks.

3. The apparatus of claim 1, further comprising:
an encoding mode selector which selects whether to encode the multi-view video using the deviations between the disparity vectors or whether to encode the multi-view video using the deviations of the deviations between the disparity vectors, according to predetermined criteria, and sets mode information based on a result of the selection, wherein the encoder encodes the multi-view video based on the mode information.

4. The apparatus of claim 1, wherein the disparity deviation calculator comprises:
a first buffer which stores the disparity vectors;
a primary calculation performing unit which calculates deviations between the disparity vectors stored in the first buffer;
a second buffer which stores the deviations between the disparity vectors; and
a secondary calculation performing unit which calculates the deviations of the deviations between the disparity vectors.

5. A method of encoding a multi-view video, the method comprising:
receiving a current frame and a reference frame;
estimating disparity vectors between the current frame and the reference frame;
calculating deviations between the disparity vectors;
calculating deviations of the deviations between the disparity vectors; and
encoding the disparity vectors, using the deviations between the disparity vectors or the deviations of the deviations between the disparity vectors,
wherein the deviations between the disparity vectors are constant, and
wherein the deviations of the deviations between the disparity vectors are zero.

6. The method of claim 5, wherein the estimating the disparity vectors between the current frame and the reference frame is in units of a predetermined number of blocks.

7. The method of claim 5, further comprising:
selecting whether to encode the multi-view video using the deviations between the disparity vectors or whether to encode the multi-view video using the deviations of the deviations between the disparity vectors; and
setting mode information according to a result of the selecting,
wherein the encoding the multi-view video comprises encoding the multi-view video based on the mode information.

8. The method of claim 5, wherein the calculating the deviations between the disparity vectors or the deviations of the deviations between the estimated disparity vectors comprises:

storing the disparity vectors;
calculating the deviations between the disparity vectors;
storing the deviations between the disparity vectors; and
calculating the deviations of the deviations between the disparity vectors.

9. An apparatus for decoding a multi-view video, the apparatus comprising:
an encoding mode checking unit which checks a mode information indicating a multi-view video encoding mode included in an encoded multi-view video;
a disparity vector determining unit which determines disparity vectors for the multi-view video according to a result of checking the mode information; and
a decoder which decodes the multi-view video using the disparity vectors,
wherein the mode information indicating the multi-view video encoding mode indicates that the disparity vectors are encoded using deviations between disparity vectors or that the disparity vectors are encoded using deviations of the deviations between the disparity vectors,
wherein the deviations between the disparity vectors are constant, and
wherein the deviations of the deviations between the disparity vectors are zero.

10. The apparatus of claim 9, wherein the disparity vector determining unit, if the mode information indicates that the multi-view video is encoded using the deviations between the disparity vectors and a deviation of a disparity vector DVi of a block positioned at a current location i is dDVi, sums a disparity vector DVi-1 of a previous block and the deviation dDVi of the disparity vector DVi to determine the disparity vector DVi of the block positioned at the current i location.

11. The apparatus of claim 9, wherein the disparity vector determining unit if the mode information indicates that the multi-view video is encoded using the deviations of the deviations between the disparity vectors and a deviation of a deviation dDVi of a disparity vector DVi of a block positioned at a current location i is ddDVi, sums a deviation dDVi-1 of a disparity vector DVi-1 of a previous block and the deviation ddDVi of the deviation dDVi of the disparity vector DVi to determine the deviation dDVi of the disparity vector DVi of the block positioned at the current location i, and
sums the disparity vector DVi-1 of the previous block and the deviation dDVi of the disparity vector DVi to determine the disparity vector DVi of the block positioned at the current i location.

12. A method of decoding a multi-view video, the method comprising:
checking a mode information indicating a multi-view video encoding mode included in an encoded multi-view video;
determining disparity vectors for the multi-view video according to a result of the checking the mode information; and
decoding the multi-view video using the disparity vectors,
wherein the mode information indicating the disparity vectors are encoding mode indicates whether the multi-view video is encoded using deviations between the disparity vectors or whether the disparity vectors are encoded using deviations of the deviations between the disparity vectors,
wherein the deviations between the disparity vectors are constant, and
wherein the deviations of the deviations between the disparity vectors are zero.

13. The method of claim 12, wherein the determining the disparity vectors comprises if the mode information indicates that the multi-view video is encoded using the deviations between the disparity vectors and a deviation of a disparity vector $DV_i$ of a block positioned at a current location i is $dDV_i$, summing a disparity vector $DV_{i-1}$ of a previous block and the deviation $dDV_i$ of the disparity vector $DV_i$ to determine the disparity vector $DV_i$ of the block positioned at the current location i.

14. The method of claim 12, wherein the determining the disparity vectors comprises:

if the mode information indicates that the multi-view video is encoded using the deviations of the deviations between the disparity vectors and a deviation of a deviation $dDV_i$ of a disparity vector $DV_i$ of a block positioned at a current location i is $ddDV_i$, summing a deviation $dDV_{i-1}$ of a disparity vector $DV_{i-1}$ of a previous block and the deviation $ddDV_i$ of the deviation $dDV_i$ of the disparity vector $DV_i$ to determine the deviation $dDV_i$ of the disparity vector $DV_i$ of the block positioned at the current location i; and summing the disparity vector $DV_{i-1}$ of the previous block and the deviation $dDV_i$ of the disparity vector $DV_i$ to determine the disparity vector $DV_i$ of the block positioned at the current location i.

15. A non-transitory computer-readable recording medium storing a computer program for executing a method of encoding a multi-view video, the method comprising:

receiving a current frame and a reference frame;

estimating disparity vectors between the current frame and the reference frame;

calculating deviations between the disparity vectors;

calculating deviations of the deviations between the disparity vectors; and encoding the disparity vectors, using the deviations between the disparity vectors or the deviations of the deviations between the disparity vectors, wherein the deviations between the disparity vectors are constant, and wherein the deviations of the deviations between the disparity vectors are zero.

16. A non-transitory computer-readable recording medium storing a computer program for executing a method of decoding a multi-view video, the method comprising:

checking a mode information indicating a multi-view video encoding mode included in an encoded multi-view video;

determining disparity vectors for the multi-view video according to a result of the checking the mode information; and decoding the multi-view video using the disparity vectors, wherein the mode information indicating the multi-view video encoding mode indicates whether the disparity vectors are encoded using deviations between the disparity vectors or whether the disparity vectors are encoded using deviations of the deviations between the disparity vectors, wherein the deviations between the disparity vectors are constant, and wherein the deviations of the deviations between the disparity vectors are zero.

* * * * *